R. PORTER.

Grain Meter.

No. 516. Reissued Dec. 22, 1857.

Sectional views.

N. PETERS, Photo-Lithographer, Washington, D. C.

UNITED STATES PATENT OFFICE.

RUFUS PORTER, OF WASHINGTON, DISTRICT OF COLUMBIA.

IMPROVEMENT IN AUTOMATIC GRAIN-WEIGHING MACHINES.

Specification forming part of Letters Patent No. 17,230, dated May 5, 1857; Reissue No. 516, dated December 22, 1857.

*To all whom it may concern:*

Be it known that I, RUFUS PORTER, of the city and county of Washington, in the District of Columbia, have invented a new and useful Grain-Weighing Machine; and I do hereby declare that the following is a full and exact description thereof, reference being had to the accompanying drawings, and to the letters of reference marked thereon.

Figure 1:
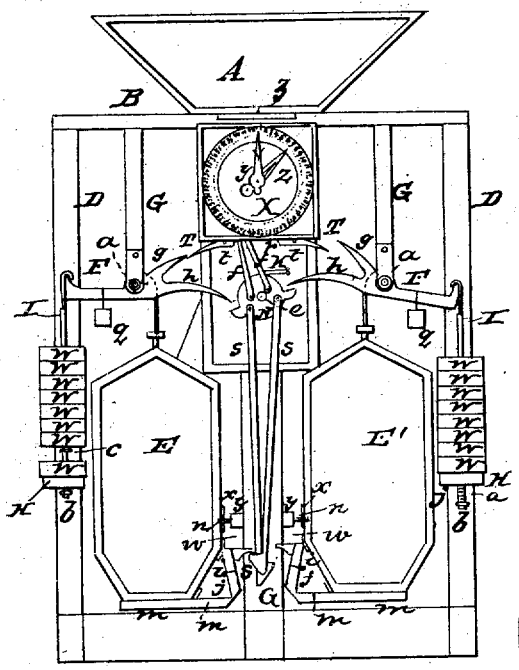
Figure 2:
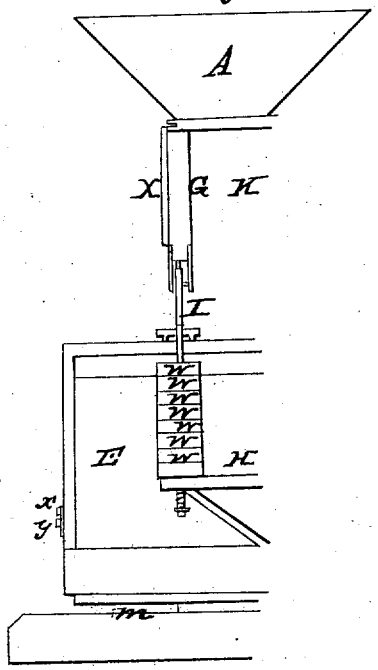
Figure 3:
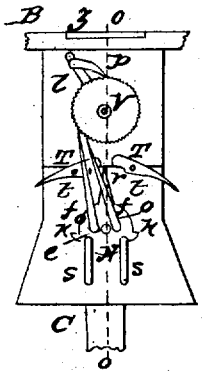
Figure 4:
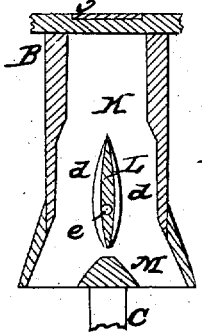
Figure 5:
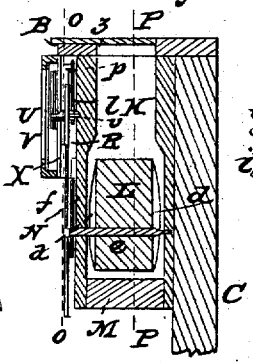
Figure 6:
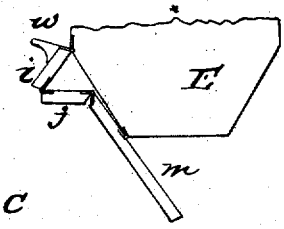

Figure 1 is a front elevation. Fig. 2 is a side elevation. Fig. 3 is a vertical section of the head on line O O of Fig. 5. Fig. 4 is a vertical section of the spout on line P P of Fig. 5. Fig. 5 is a vertical section of the spout on line Q Q of Fig. 3. Fig. 6 is a section of the right bucket, the trap-door being open and knuckle-braces contracted.

To enable others skilled in the art to make and use my invention, I will proceed to describe its construction and operation.

A hopper, A, is mounted upon a table, B, which is supported by a central post, C, and two side posts, D D. Two buckets, E E′, are suspended by leather straps from the centerward ends of the balance-beams F F′, which are mounted upon pivots *a a*, in the manner of ordinary scale beams or steelyards, and their bearings are supported by two hangers, G G′, and the ends of each balance-beam are curved on arcs of circles of which the pivot-bearing is the center. From the outward ends of the balance-beams are suspended two lifting-rods, I I, upon which are arranged a series of circular weights, W W, which ordinarily rest upon two broad arms, H H. The weights and the arms are perforated by vertical apertures through which the rods pass downward.

Between each bottom weight and the next above it is a pin or nut, as shown at *c*, Fig. 1, by means of which the weights above are occasionally elevated in advance of the bottom weight. An inch below the other weight (the bottom weight) is another pin or nut, as shown at *b*, Fig. 1, between which and the bottom weight is a helical spring, J, which is ordinarily open and extended, but is compressed and closed up when the upper weights are raised; but when the balance-beam has reached a horizontal position the bottom weight is also raised.

To the front of the central post, C, is attached a spout, K, within which a valve-gate, L, is mounted upon a shaft, *e*, and extends twice as far above the shaft as below it. The valve-gate is somewhat wider than the ordinary interior of the spout; but the latter is larger internally in that portion which contains the gate than above it. The front and rear edges are furnished with thin plate flanges *d d*, and its motions to the right or left are restricted to the ordinary width of the spout. Below the valve-gate is fixed a division-block, M, and the sides of the spout are extended right and left, so that the different positions of the valve gate direct the descending grain into either branch, as occasion requires.

Upon the front end of the valve-shaft *e* is mounted a valve-plate, N, to the front of which are connected two driving pawls or fingers, *f f*, which alternately move a ratchet-wheel, R, (see Fig. 3,) and also two tripping-rods, S S′, to the bottoms of which are attached two tripping-points, *s s*, for purposes hereinafter explained.

The two buckets E E′ are furnished with trap-doors *m m*, which are hinged to the bottom thereof, opening downward and extending centerward two or three inches from the line of the hinges, and the centerward edges are made heavy enough to preponderate and close the bottom of the buckets. To the projecting edge of each trap-door and to the centerward side of the bucket a pair of knuckle-braces, *i i*, are connected by hinges, being also connected to each other by a central hinge in such a manner as to open freely centerward, but not toward the bucket. From the upper end of each brace *i* an arm, *w*, projects centerward nearly to the tripping-rod S′. Immediately under the right arm *w* is a tripping-point, *s*, which is attached to the left tripping-rod, and under the left arm is a tripping-point attached to the right tripping-rod.

The knuckle-braces, when in their ordinary positions, prevent the opening of the trap-door; but the buckets are so adjusted that when either of them become sufficiently charged to preponderate and elevate its respective weights and change the position of the valve-plate N the tripping point *s* comes in contact with the arm *w*, and thereby trips the knuckle-brace, thus allowing the trap-door to open and discharge the contents of the bucket. Then the trap-door and knuckle-braces instantly resume their ordinary positions.

From each balance-beam F two horns, *g* and *h*, project centerward, and from the valve-plate N two wings, *k k*, project horizontally right and left. Above these wings are two catch-levers, T T, which are mounted upon fulcrum-pivots *t t*, and each has a shoulder-catch, *r r*, for the purpose of arresting the motion of the apex of the valve-plate N and retaining it until tripped by the horn *g*.

Above the valve-plate is a small shaft, *u*, upon which is mounted a ratchet-wheel, R, to the rear of which is attached a small eccentric, *v*. Upon this shaft, in front of the ratchet-wheel, is a hollow shaft, U, upon which is mounted another ratchet-wheel, V. A small shackle-bar, *l*, is mounted upon the eccentric *v*, and to the upper end thereof is connected a vibrating pawl, *p*, which gives motion to the ratchet V. The ratchet R is moved by the fingers *f f*. The shafts have their front bearing in a dial-plate, X, in front of which are mounted two indices, Y Z. The index Y performs a revolution while the buckets are being filled and discharged fifty times each, and the index Z revolves once while fifty revolutions are performed by the first.

To the centerward corner of the bucket is attached a short flange, *x*, which slides vertically through grooves or notches made for that purpose in the guide-pins *n*, which are attached to two horizontal guide-bars, *y y*, in Fig. 2.

The dial-plate is protected by a frame and glass, and immediately above it, at the head of the spout, is a horizontal sliding gate, *z*, whereby the stream of grain is regulated or occasionally suspended.

The operation of my invention is as follows: The valve-plate N being placed in its right position, and the hopper being supplied with grain, and the gate *z* being open, the left-hand bucket receives the stream of grain till the weight thereof elevates all the weights on the left save one, and the left balance-beam is brought to a horizontal, Fig. 1, by which movement the horn *h* depresses the wing *k*, whereby the valve-plate is brought to the position shown in Fig. 1, resting against the shoulder-catch of the catch-lever T, while the tripping horn *g* is brought into contact with the left end of said lever. By this position of the valve-gate (indicated by valve-plate N) the stream of grain is divided, and three-fourths thereof is conducted to the right bucket, E; but when the left bucket preponderates and raises the bottom weight of the left series the horn *g* trips catch lever T, and the valve-plate, being thus liberated, falls into its left position, suspending the descent of grain in that direction, and at the same time and by the same movement elevating the tripping-point *s*, thereby tripping the left knuckle-braces and discharging the grain from the bucket; then the trap-door instantly closes and the knuckle-braces resume their ordinary position. The same process is repeated with the right bucket, and the index Z is moved one point by the reciprocal motion of the fingers.

The adjustment of the requisite weight is aided by two movable poises, *q q*. The fingers *f f* are drawn toward the ratchet-wheel by two elastic cords, *o o*.

What I claim as new, and desire to secure by Letters Patent, is—

1. The combination of the tripping-rods S with the valve-plate N and knuckle-braces *i* and *j*, whereby the movement of the valve-gate L (which is operated by means of scale-beams F) causes the contents of the buckets E to be discharged alternately, as set forth.

2. The knuckle-braces *i* and *j*, in combination with the trap-doors *m*, whereby the latter are spontaneously closed and fastened immediately after the grain is discharged, as set forth.

3. The balance-beams F, with horns I, in combination with valve-plate N and catch-levers T, so arranged that the weight of grain in one bucket changes the position of the valve-gate, so as to turn a portion of the current of the grain into the other bucket, before the first bucket receives the quantity the second horn trips the catch, and thereby turns the balance of the current of the grain into the other bucket, as set forth.

RUFUS PORTER.

Witnesses:
JOSEPH H. AUDOIM,
CHAS. H. OCHES.